United States Patent Office 2,751,394
Patented June 19, 1956

2,751,394

PROCESS OF TREATING ETHYLENE UREA AND PRODUCT

Ralph Marotta, Malden, Mass., assignor to Monsanto Chemical Company, St. Louis, Mo., a corporation of Delaware No Drawing. Application November 8, 1954, Serial No. 467,657

15 Claims. (Cl. 260—309.7)

The present invention relates to improvements in ethylene urea. This invention also relates to a process of inhibiting the intensification in color of ethylene urea, particularly to a process of inhibiting the intensification in color of ethylene urea which normally exhibits a darkening in color in the presence of air in storage and/or by the action of ultra violet light. This invention also relates to ethylene urea which is inhibited against intensification in color.

A number of processes have been proposed in the prior art for the preparation of ethylene urea. Thus, Fisher and Koch have proposed as early as 1885 the synthesis of ethylene urea by digesting ethylene diamine and ethyl carbonate at a temperature of about 180° C. In U. S. Patent No. 2,425,627 to Loder issued August 12, 1947, the preparation of ethylene urea from urea and ethylene glycol is described. In U. S. Patent No. 2,430,874 to Hale issued November 18, 1947, the preparation of ethylene urea from ethylene diamine and ammonium carbonate is described. In U. S. Patent No. 2,504,431 to Loder issued April 18, 1950, and U. S. Patent No. 2,517,750 to Wilson issued August 8, 1950, the preparation of ethylene urea from ethylene diamine and urea is described. One of the uses for ethylene urea is in the preparation of dimethylol ethylene urea which is employed to a large extent in the treatment of cellulosic textile materials. However, one of the problems which has been encountered with commercially produced ethylene urea is that the material darkens in color in the presence of air when stored for periods of time in containers in the absence of light, and darkens at a more rapid rate when exposed to ultra-violet light. Thus, unless the ethylene urea is used for the manufacture of other compounds shortly after it is made, the color often increases to such an extent that it is not entirely satisfactory for the purpose contemplated which means that the product may require purification prior to use.

It is one object of this invention to provide a process of treating ethylene urea so that its color will not change to a detrimental extent in storage and/or on exposure to ultra-violet light.

It is a further object of this invention to provide ethylene urea which has been stabilized against a detrimental change in color in storage and/or on exposure to ultra-violet light.

Still further objects and advantages of this invention will be apparent from the following description and the appended claims.

The processes of this invention are carried out, in general, by admixing molten ethylene urea containing color-forming impurities, that is, impurities which cause a darkening in color in the presence of air, with an aliphatic hydroxy polycarboxylic acid or a salt thereof which is soluble to the extent of at least 0.05% by weight in molten ethylene urea, for example, an acid such as citric acid or a salt thereof such as diammonium citrate. The amount of such acid or salt used should be sufficient to prevent a detrimental change in color when the ethylene urea is stored for considerable periods of time in the presence of air or is exposed to light in the presence of air. The minimum amount of such acid or salt employed depends to some extent on the particular acid or salt which is used, but, in general, is about 0.05% by weight based on the ethylene urea. However, larger amounts of such acid and/or salt may be used, for example, amounts up to 5% by weight based on the ethylene urea, but in such instances the ethylene urea may contain more of the acid or salt than is desired for its end use. If such larger amounts of the acid or salt are undesirable in the ethylene urea, satisfactory results may be obtained by using the salt or acid in amounts of 0.05 to 0.3%, preferably 0.08 to 0.15%, by weight based on the ethylene urea.

A further understanding of the processes and compositions of this invention will be obtained from the following specific examples which are intended to illustrate the invention, but not to limit this invention. Parts and percentages are by weight unless otherwise specified.

Example 1

The ethylene urea employed in this example and in Example 2 was a technical product prepared by reacting urea and an aqueous solution of 85% ethylene diamine, using a slight stoichiometric excess of ethylene diamine, at a temperature up to 235° C. with the evolution of 2 mols of ammonia per mol of urea, and the final removal of volatiles such as water and excess ethylene diamine by distillation. The product at 235° C. was in the form of a melt and was dumped into trays, allowed to solidify and then flaked. The technical ethylene urea had a crystallizing point of 130.8° C. and contained 1.5 mol per cent of impurities including traces of metallic compounds, ethylene diamine, urea, high-boiling compounds and nitrogenous compounds of cyclic and chain structure. In the molten state as prepared the technical ethylene urea had a color of 4 on the Gardner Color Standards (1933). These color standards are described in "Physical and Chemical Examination of Paints, Varnishes, Lacquers and Colors" 10th edition, (1933), by Henry A. Gardner and G. G. Sward.

Forty parts of the above technical ethylene urea was melted at a temperature of 140° C. and to the melt was added 0.04 parts (0.1% of the weight of the melt) of citric acid. After stirring the citric acid in the melt for one minute, during which time the citric acid dissolved in the melt, the resulting melt was poured into a tray and allowed to solidify at room temperature. The solid ethylene urea containing the citric acid uniformly distributed therein was then flaked into the form of particles having a thickness of 1 to 2 millimeters and an average area of about 0.25 square inch on a side. The flakes were then placed in a tightly stoppered "Pyrex" test tube and exposed for 24 hours at a temperature of 110° F. to ultra-violet light in a Fade-Ometer designated as an Atlas Color Fade-Ometer—type F DA-R manufactured by Atlas Electric Devices Company, Chicago, Illinois.

Fakes of the technical ethylene urea which had not been treated with citric acid were exposed to ultra-violet light in the same manner.

After the exposure period in the Fade-Ometer the odor of the flakes was noted. Also, water-wet red litmus paper was suspended in the air space above the flakes for about 10 seconds to note any bluing due to evolution of ammonia. The ethylene urea flakes were then melted and the melt was poured into a tube used in the Gardner Color Standards test and the color of the melt was compared with the Gardner Color Standards. The results of the foregoing tests are given below:

| Material Tested | Odor | Ammonia Vapor | Gardner Color Standards [1] |
|---|---|---|---|
| Technical ethylene urea plus 0.1% citric acid. | None | None | 5 |
| Technical ethylene urea per se. | Strong amine-type | Present | 10 |

[1] In the Gardner Color Standards the higher numbers indicate greater intensity of color.

From the above tests, it is seen that the technical ethylene urea having 0.1% citric acid uniformly distributed therein does not change in odor or color to any appreciable extent on accelerated exposure to ultra-violet light, whereas the technical ethylene urea per se acquires an amine odor and materially darkens in color under the same conditions.

*Example 2*

Various aliphatic hydroxy polycarboxylic acids and salts were employed instead of citric acid, and at various concentrations, with the technical ethylene urea prepared as described in the first paragraph of Example 1. The procedures of the second and fourth paragraphs of Example 1 were employed with the following results:

| Material Incorporated in Ethylene Urea | Gardner Color Standards (1933) |
|---|---|
| 1. None | 10 |
| 2. 0.3% diammonium citrate $(NH_4)_2HC_6H_5O_7$ | 5 |
| 3. 0.3% sodium acid tartrate $NaHC_4H_4O_6 \cdot H_2O$ | 5 |
| 4. 0.05% citric acid | 7 |
| 5. 2.0% citric acid | 4 |
| 6. 0.1% tartaric acid | 5 |

In the above experiments the products having a Gardner color of 5 or less had a negligible amine-type odor and evolved no free ammonia. The product having a Gardner color of 7 had an amine-type odor and evolved some free ammonia, but was considered satisfactory. The product having a Gardner color of 10 had a strong amine-type odor and evolved free ammonia, and was considered to be not completely acceptable as a commercial product.

*Example 3*

A sample of war-surplus ethylene urea (Gardner color in a molten state was 7) which was purchased in a tightly sealed container from which light was excluded, was tested using the procedures described in the second and fourth paragraphs of Example 1, with the following results:

| Material Incorporated in Ethylene Urea | Gardner Color Standard (1933) |
|---|---|
| None | 9 |
| 0.5% citric acid | 6 |
| 0.5% tartaric acid | 5 |

The above results show that the untreated ethylene urea actually darkened when exposed to accelerated aging under ultra-violet light, whereas the ethylene urea in which citric acid or tartaric acid were incorporated actually became lighter in color than the original material which had not been exposed to ultra-violet light during storage.

Although the above examples illustrate the inhibition of intensification of color and odor development by the treatment of technical ethylene urea prepared from ethylene diamine and urea, inhibition of color intensification as described herein is also applicable to ethylene urea prepared from other ingredients or by other processes so long as the ethylene urea is susceptible to color change in the presence of air in storage and/or on exposure to ultra-violet light. The present invention is generally applicable to the inhibition of color change in ethylene urea containing color-forming impurities such as traces of metallic compounds and nitrogenous compounds formed from the raw materials employed in the preparation of the ethylene urea. Metallic compound impurities are obtained, for example, when the ethylene urea is prepared in metal apparatus or equipment. The invention described herein is particularly applicable in the case of ethylene urea which has a Gardner color, as hereinbefore described, of about 1 to 10 as initially prepared, but is preferably applicable in those instances where the freshly prepared ethylene urea has a Gardner color, as hereinbefore described, of about 3 to 7. By the use of the processes of this invention, it is possible to successfully inhibit the darkening of such ethylene urea, that is, prevent an intensification of color in the presence of air in storage or on exposure to ultra-violet light.

A wide variety of aliphatic hydroxy polycarboxylic acids or salts thereof may be used instead of those described in the examples, provided such acids or salts are soluble in molten ethylene urea to the extent of at least 0.05% by weight. In other words, the successful inhibition of color intensification in solid ethylene urea is dependent on the solubility of such acids or salts in molten ethylene urea. For example, potassium citrate $(K_3C_6H_5O_7 \cdot H_2O)$, sodium citrate $(2Na_3C_6H_5O_7 \cdot 11H_2O)$ and potassium sodium tartrate are all insoluble in molten ethylene urea, at least they will not dissolve in molten ethylene urea in concentrations as high as 0.05% by weight, and it has presently been found that such compounds will not successfully inhibit color intensification of ethylene urea under the conditions described herein when they are added to molten ethylene urea. As examples of aliphatic hydroxy polycarboxylic acids and salts thereof which may be used, in addition to those described in the foregoing examples, may be mentioned tartronic acid, malic acid, trihydroxyglutaric acid, mucic acid, isocitric acid and the like, and the corresponding ammonium salts and potassium or sodium acid salts, for example, sodium acid tartronate. Monosodium citrate and monopotassium citrate may also be used.

The preferred class of aliphatic hydroxy polycarboxylic acids and salts thereof are the saturated compounds, that is, compounds free of carbon to carbon unsaturation, and having 4 to 6 carbons, from 1 to 2 hydroxy groups, and from 2 to 3 carboxyl groups. The preferred species of compounds are citric acid and tartaric acid since they give superior results.

The hydroxy polycarboxylic acids or salts may be incorporated in the ethylene urea at various stages during the production of ethylene urea, but it is essential that such acids or salts be uniformly distributed throughout the solid ethylene urea. The formation of a heterogeneous mixture of particles of solid ethylene urea and particles of the acid or salt by mechanical admixture does not enable inhibition of color intensification, and does not accomplish the objects of this invention. As is noted previously herein, the salt or acid must be incorporated in the ethylene urea so that it is uniformly distributed throughout the solid ethylene urea phase. This is accomplished in accordance with this invention by admixing such acid and/or salt with molten ethylene urea to produce a solution of the acid and/or salt in the molten ethylene urea. The molten ethylene urea is then allowed to solidify, and may be broken up into particles or flaked, and then packaged; or the molten ethylene urea may be quenched with water to form an aqueous solution containing, for example, from about 40 to 65% by weight of solids, and sold in that form.

A suitable stage at which the hydroxy polycarboxylic acid and/or salt is incorporated in the molten ethylene urea is after the ethylene urea has been produced as a technical grade molten product (without purification by crystallization or distillation of the ethylene urea per se) after substantially complete removal of the volatile impurities which boil at a temperature below 235° C. For example, when the ethylene urea is prepared from ethylene diamine and urea the preferred stage of addition of the acid and/or salt is while the ethylene urea is still molten, but substantially all of the ammonia, water and excess ethylene diamine have been removed, and just prior to final solidification of the ethylene urea or the addition of water to form an aqueous solution thereof. The molten ethylene urea may be at any temperature between the melting point and below the decomposition temperature. Temperatures of 135° to 270° C. are suitable.

The principles of this invention may also be applied to inhibiting the darkening of color of aqueous solutions of ethylene urea containing from about 40 to 65% by weight of solids by incorporating the hydroxy polycarboxylic acids or salts, hereinbefore described, in such solutions.

What is claimed is:

1. Solid ethylene urea having uniformly distributed therein a stabilizer substance selected from the group consisting of saturated aliphatic hydroxy polycarboxylic acids containing from 4 to 6 carbon atoms, inclusive, and acid salts thereof selected from the group consisting of ammonium, sodium, potassium, and mixtures thereof, which are soluble in molten ethylene urea to the extent of at least 0.05 percent by weight, said substance being present in an amount from about 0.05 to about 5 percent by weight.

2. The composition of claim 1 wherein the stabilizer is present in an amount of from about 0.05 to about 2 percent by weight.

3. The composition of claim 1 wherein the stabilizer is present in an amount of from about 0.05 to about 0.3 percent by weight.

4. Solid ethylene urea having uniformly distributed therein from about 0.05 to about 5 percent by weight of citric acid.

5. Solid ethylene urea having uniformly distributed therein from about 0.05 to about 0.3 percent by weight of citric acid.

6. Solid ethylene urea having uniformly distributed therein from about 0.05 to about 5 percent by weight of tartaric acid.

7. Solid ethylene urea having uniformly distributed therein from about 0.05 to about 0.3 percent by weight of tartaric acid.

8. An aqueous solution containing from about 40 to about 65 percent by weight of ethylene urea containing color-forming impurities and a color-stabilizer selected from the group consisting of saturated aliphatic hydroxy polycarboxylic acids containing from 4 to 6 carbon atoms, inclusive, and acid salts thereof selected from the group consisting of ammonium, sodium, potassium, and mixtures thereof, said color-stabilizer being present in the solution in an amount of from about 0.05 to about 2 percent by weight of the ethylene urea whereby the solution is stabilized against substantial intensification of color in the presence of air.

9. A process of inhibiting the intensification of color of ethylene urea which comprises uniformly distributing in the ethylene urea a substance selected from the group consisting of saturated aliphatic hydroxy polycarboxylic acids containing from 4 to 6 carbon atoms, inclusive, and acid salts thereof selected from the group consisting of ammonium, sodium, potassium, and mixtures thereof, said substance being present in an amount of from about 0.05 to about 5 percent by weight of the ethylene urea.

10. A process of inhibiting the intensification of color of ethylene urea containing color-forming impurities which comprises dissolving a substance selected from the group consisting of saturated aliphatic hydroxy polycarboxylic acids containing from 4 to 6 carbon atoms, inclusive, and acid salts thereof selected from the group consisting of ammonium, sodium, potassium, and mixtures thereof, which are soluble in molten ethylene urea in amounts of at least 0.05 percent by weight, in said ethylene urea while the ethylene urea is in the molten state but below the decomposition temperature thereof, said substance being employed in amounts of from about 0.05 to about 2 percent by weight, and subsequently solidifying the ethylene urea.

11. The process of claim 10, wherein the color inhibitor is citric acid.

12. The process of claim 10, wherein the color inhibitor is tartaric acid.

13. The process of claim 11, wherein the citric acid is present in an amount of from about 0.05 to about 0.3 percent by weight.

14. The process of claim 12, wherein the tartaric acid is present in an amount of from about 0.05 to about 0.3 percent by weight.

15. A process of producing aqueous solutions of ethylene urea which are inhibited against intensification of color which comprises admixing molten ethylene urea containing color forming impurities at a temperature below the decomposition temperature of the ethylene urea with from about 0.05 to about 5 percent by weight of a substance selected from the group consisting of saturated aliphatic hydroxy polycarboxylic acids containing from 4 to 6 carbon atoms, inclusive, and acid salts thereof selected from the group consisting of ammonium, sodium, potassium, and mixtures thereof, which are soluble in molten ethylene urea to the extent of at least 0.05 percent by weight, until said substance is dissolved in the molten ethylene urea in an amount of at least 0.05 percent by weight and subsequently admixing said molten ethylene urea while it is in the molten state with an amount of water sufficient to provide a solution containing from about 40 to about 65 percent by weight of ethylene urea.

References Cited in the file of this patent

UNITED STATES PATENTS 2,469,377    Flett _____ May 10, 1949

OTHER REFERENCES

Lategan: Chem. Abst., vol. 43, col. 3568 (1949).